Nov. 5, 1968 R. E. McHARG 3,408,792
PURIFICATION OF HYDROGEN-CONTAINING GASEOUS STREAMS
Filed Aug. 22, 1966
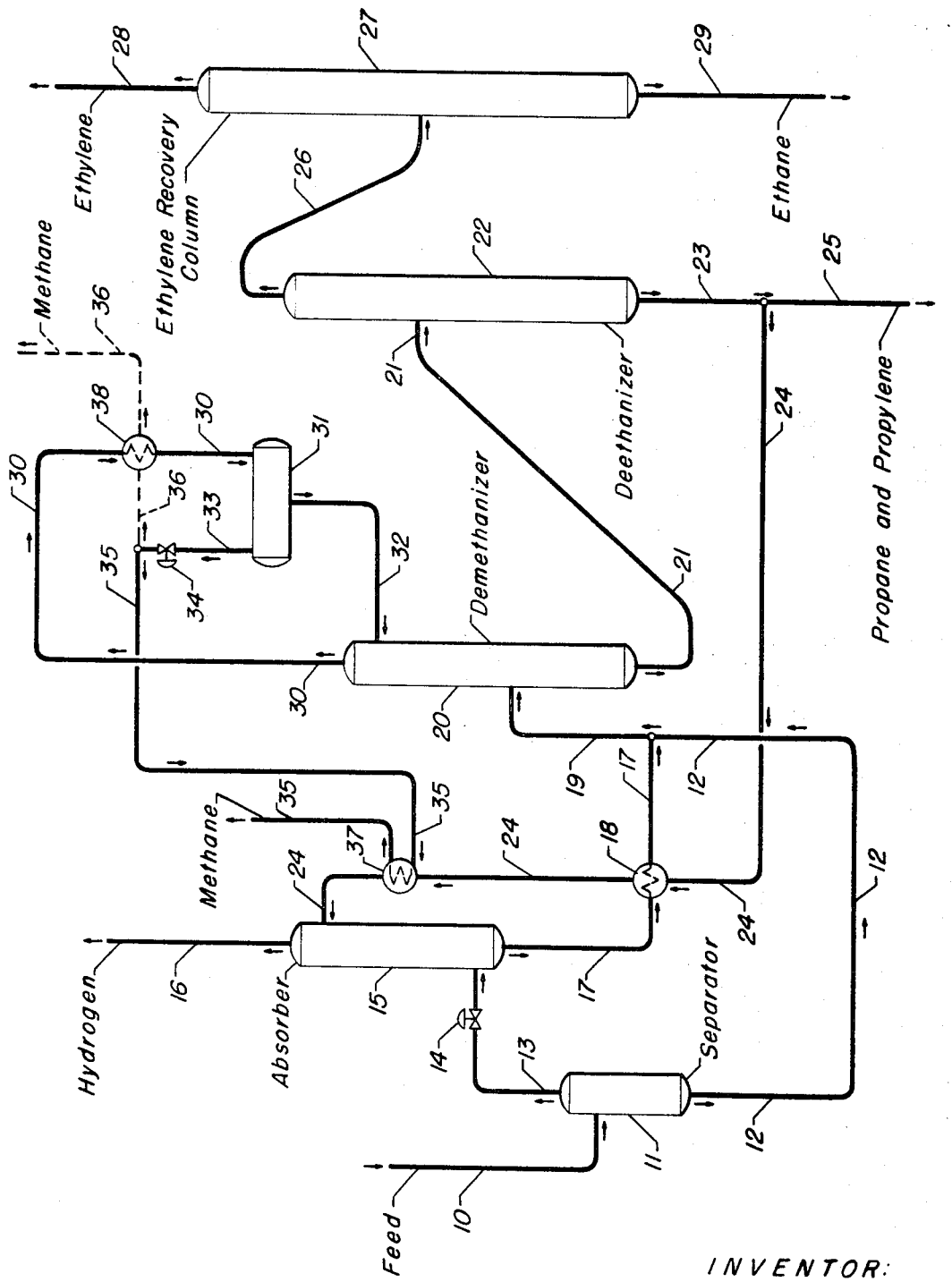
INVENTOR:
Robert E. McHarg
BY: *James R. Hooteon, Jr.*
*Joseph E. Mason, Jr.*
ATTORNEYS

United States Patent Office

3,408,792
Patented Nov. 5, 1968

3,408,792
PURIFICATION OF HYDROGEN-CONTAINING
GASEOUS STREAMS
Robert E. McHarg, Arlington Heights, Ill., assignor to Universal Oil Products Company, Des Plaines, Ill., a corporation of Delaware
Filed Aug. 22, 1966, Ser. No. 573,894
7 Claims. (Cl. 55—43)

ABSTRACT OF THE DISCLOSURE

Process for purifying and recovering hydrogen from a gaseous feed mixture comprising hydrogen and $C_1$ to $C_3$ hydrocarbons using an absorber system, a demethanizing tower and a deethanizer. The absorber is operated at a temperature of at least as low as —90° F. so that hydrogen gas of at least 75% by volume hydrogen can be recovered from the absorber system. Purified methane and separate $C_2$ and $C_3$ fractions are also recovered in the process.

---

This invention relates to the separation of gases. It particularly relates to a method for recovering a concentrated stream of hydrogen from a gaseous mixture. It specifically relates to a method for separating hydrogen from normally gaseous hydrocarbons while simultaneously recovering ethylene in high concentration therefrom. This invention also relates to my copending patent application Ser. No. 573,893 entitled "Process for Separating the Components of a Gaseous Mixture," filed on even date herewith.

In conventional refinery practice various processes commonly employed in refining petroleum products yield by-product gases containing hydrogen in admixture with methane and other normally gaseous light hydrocarbons such as ethane, ethylene, propane, propylene, etc. Examples of such processes are thermal cracking, catalytic cracking, catalytic reforming, various combinations of these processes, and the like. Typically, the concentration of hydrogen in these by-product gaseous streams usually is too low to permit its use in any way other than as fuel. However, it is highly desirable to be able to utilize a concentrated stream of hydrogen in other processes, such as the synthesis of ammonia, hydrogenation of edible oils, hydrotreating lubricating oils, reuse in hydrogenation and catalytic reforming operations, and the like. Therefore, it is desirable to separate and recover the hydrogen from such other gases for use in refinery operations.

Ethylene also has become of increasing importance as a raw material and is useful in the manufacture of synthetic chemical products, plastics, lubricants, fuels, etc. Ethylene generally is present in the same by-product gaseous streams as is hydrogen, discussed hereinabove.

Separation of ethylene from these by-product gaseous streams generally can be accomplished by ordinary fractionation means, but such separation is expensive due to the refrigeration requirements for the conventional fractionation schemes as practiced by those skilled in the art. Accordingly, it is also desirable to recover ethylene in substantially pure form in a more economic and facile manner.

The prior art procedures for separating components of refinery gases generally involve the use of an absorption step in which heavier components to a large extent are selectively absorbed from the lighter components by means of an absorption medium, such as kerosene, followed by various stripping and reactivating steps for separating the absorbed components from each other. Since hydrogen and methane are rejected together in such a process, additional processing equipment is necessary in order to remove the methane from the hydrogen thereby producing a concentrated stream of hydrogen suitable for reuse in refinery processes. Additionally, the prior art schemes of also recovering ethylene from such a hydrogen separation step, are not only peculiarly difficult but prohibitively expensive to accomplish by fractionation means alone.

Accordingly, it is an object of this invention to provide a method for separating gases.

It is another object of this invention to provide a process for separating the components of a gaseous mixture comprising hydrogen and $C_1$ to $C_3$ hydrocarbons in a more economic and facile manner than has heretofore been possible.

It is still another object of this invention to provide a process for purifying hydrogen from a principally gaseous mixture containing the same.

It is a still further object of this invention to produce high purity hydrogen from gaseous fractions containing hydrogen and other low molecular weight gases by a process involving savings in utility costs and capital investment cost.

These and other objects of the present invention are accomplished by the process particularly described hereinbelow with reference to the appended drawing which is a schematic flow diagram representing one illustrative embodiment of the invention.

According to the present invention, these objects are accomplished in a process for separating the components of a gaseous mixture comprising hydrogen and $C_1$ to $C_3$ hydrocarbons in which a demethanizing fractionating column is employed and the feed mixture is contacted with a lean oil in an absorber prior to demethanizing. The invention embodies the step of circulating the lean oil in the absorber under conditions sufficient to absorb substantially all of the $C_1$ hydrocarbons such that the hydrogen off-gas stream from the absorber comprises at least 75% by volume hydrogen.

A particular embodiment of the present invention involves a temperature of at least —90° F. in the absorber.

A specific embodiment of the invention relates to the use of a specific absorption medium wherein said lean oil comprises a portion of the $C_3$ hydrocarbons originally in said mixture.

Accordingly, this invention embodies a process for purifying hydrogen from a principally gaseous mixture comprising hydrogen and $C_1$ to $C_3$ hydrocarbons which comprises the steps of introducing said mixture into a separation zone under conditions including a temperature from —40° F. to —80° F. sufficient to separate said mixture into a vapor product comprising hydrogen and methane, and a liquid product comprising hydrocarbons substantially free from hydrogen; passing said vapor product into an absorber and contacting therein with a hereinafter specified lean oil under conditions including a temperature of at least —90° F. sufficient to absorb methane while substantially rejecting hydrogen; removing from the absorber a purified hydrogen stream comprising at least 75% by volume hydrogen; withdrawing from the absorber a rich oil comprising said lean oil and absorbed hydrocarbons; introducing said rich oil and said liquid product from the separation zone into a demethanizing fractionating column under conditions sufficient to form an overhead product comprising methane and a bottoms product comprising $C_2$ and $C_3$ hydrocarbons; passing the bottoms product of the demethanizer into a deethanizing zone wherein said bottoms product is separated into a $C_2$ hydrocarbon fraction, comprising ethane and ethylene, and a $C_3$ hydrocarbon fraction, comprising propane and propylene; and, returning a portion of said $C_3$ fraction to the absorber as said lean oil specified. Additionally, ethylene in high concentration is recovered from the $C_2$ hydrocarbon fraction by simple fractionation means.

It is noted from the above description that the essence of the present invention is the removal of hydrogen and methane in separate substantially pure product streams while preferably simultaneously recovering substantially pure ethylene as a product stream.

Referring now to the drawing, the principally gaseous feed mixture is, preferably, introduced into a depropanizing column, not shown, wherein an overhead stream is taken comprising, typically, hydrogen and $C_1$ and $C_3$ hydrocarbons. After suitable treating, e.g. to remove water, the gaseous feed mixture is fed in the substantial absence of any recycle stream via line 10 into separator 11 at a pressure of from 400 to 600 p.s.i.g., typically 550 p.s.i.g., and a temperature of from —40° F. to —80° F., typically —70° F. In separator 11 a bottoms stream primarily in liquid phase and comprising hydrocarbons substantially free from hydrogen, is removed through line 12 and processed through the fractionation train as more fully discussed hereinafter.

The overhead vapor product from separator 11, comprising substantially all of the hydrogen and approximately half of the methane, is removed through conduit 13. The vapor product in conduit 13 is further cooled to a temperature of at least —90° F., typically —100° F., by external refrigeration means, or preferably, by autorefrigeration means comprising vapor expansion through valve 14 to the desired temperature. The cooled gas, at a temperature, typically, of —100° F., enters the bottom of absorber means 15. As used herein, the term "at least —90° F." refers to the warmest temperature (or minimum cold temperature) contemplated in absorber 15 and includes all temperatures colder than —90° F.

A lean oil comprising propane or a propane-propylene mixture from a source hereinafter specified, is passed through conduit 24 where it contacts heat exchangers 18 and 37 and thereupon enters the top of absorber means 15 at a temperature of, say, approximately —100° F. In absorber 15 the lean oil and the gaseous mixture contact each other counter-currently. It was discovered that under these conditions, including a temperature of at least —90° F., the $C_3$ hydrocarbon absorbing medium will absorb methane while substantially rejecting hydrogen. In essence, the absorber serves the function of selectively purifying hydrogen while maintaining substantially all of the desired, say, ethylene, in the high boiling fraction.

A purified hydrogen stream is removed from the absorber via line 16 and comprises at least 75% by volume hydrogen with the remainder being primarily methane. Typically, the hydrogen purity of the stream in line 16 is at least 80% by volume hydrogen and by proper adjustment of the operating conditions can be as high as 97% hydrogen by volume.

The rich oil leaves absorber 15 via line 17 and passes into heat exchanger 18 wherein it is heated by exchanging heat with the hereinafter specified lean oil thereby also cooling the lean oil. The heated rich oil is admixed with the liquid product from separator 11 passing through conduit 12 in line 19 where it passes in admixture into demethanizer 20. Due to the low temperatures required to liquify methane, the operating expenses of the demethanizer are very high. If the top temperature of the demethanizer is not maintained low, e.g. —110° F. to —150° F., there will be an unavoidable loss of ethylene out of the overhead fraction. However, by removing hydrogen from the feed prior to demethanizing, the demethanizer overhead system can be operated at a significantly higher temperature which is reflected in a saving of ethylene refrigeration horsepower. Thus, a increased recovery of ethylene is achieved while simultaneously producing a purified stream of hydrogen from the absorber. The economies of reducing refrigeration requirements on the demethanizing tower will be immediately evident to those skilled in the art.

The demethanizer overhead fraction is removed through line 30 and passed into reflux receiver 31. Preferably and alternatively, the overhead fraction in line 30 is heat exchanged in exchanger 38 with at least a portion of the methane removed as a product from receiver 31. A liquid portion of the overhead is returned by means of flow conduit 32 to demethanizer 20 as reflux. The vapor portion is withdrawn through flow conduit 33 and comprises primarily methane plus a small amount of hydrogen not recovered in absorber 15 previously discussed. The vapor portion of the overhead in line 33 is passed through pressure reducing valve 34 wherein it is cooled by auto-refrigeration and preferably passed via line 35 into heat exchanger 37 wherein it cools the returning lean oil in line 24 more fully discussed hereinafter. A substantially pure methane product is removed both through lines 35 and 36 or through line 35 only depending upon the heat balance desired on the absorber 15 and demethanizer 20 by those skilled in the art.

The demethanizer 20 bottom fraction is removed via line 21 and passed into deethanizer 22 at a pressure reduced from that pressure in demethanizer 20. Typically, the pressure is demethanizer 20 will be in the order of 550 p.s.i.g., while the pressure in deethanizer 22 is typically of the order of 350 p.s.i.g. The fraction in line 21 at this point comprises primarily ethane, ethylene, propane and propylene.

Deethanizer 22 is a fractionating column operated to split the demethanizer 20 bottom fraction into an overhead stream comprising ethane and ethylene, and a bottom stream comprising propane and propylene. At a pressure of about 350 p.s.i.g., typical top temperatures of about 0° F., and typical bottom temperatures of about 150° F. are employed to effect this separation. The deethanizer overhead fraction is removed via line 26 and comprises ethane and ethylene. The deethanizer bottom fraction is removed via line 23 where a portion of this fraction passes through conduit 24 as the lean oil specified in absorber 15 previously mentioned.

The remaining fraction of the deethanizer 22 bottoms is passed via line 25 out of the process, or said fraction in line 25 can be separated into a substantially pure propylene and a substantially pure propane stream by suitable fractionation means, not shown. It is intended to be embodied in the present invention alternatively for the pure propane stream so recovered to be returned to absorber 15 as said lean oil if desired by those skilled in the art.

The deethanizer overhead fraction in line 26 is introduced into ethylene fractionating column 27 at a typical pressure of about 150 p.s.i.g. At this pressure, typical top temperatures of about —60° F. and typical bottom temperatures of about —20° F. are employed to separate the ethylene from the ethane. However, in some cases pressures as high as 300 p.s.i.g., and temperatures up to —30° F. to +10° F. may be used satisfactorily. The substantially pure ethylene stream is removed from the recovery column 27 by means of conduit 28 for recovery by means well known to those skilled in the art. The ethylene column bottom fraction is removed via line 29 and comprises substantially pure ethane.

It is noted from the above description, that the recovery of purified hydrogen and ethylene is accomplished by means more facile and economic than has heretofore been known to those skilled in the art. Thus, those in the art are aware that absorber 15 must be operated under substantially isothermal conditions in order to properly make the selective absorption described. Accordingly, sufficient intercoolers must be supplied to counterbalance the heat of solution encountered through the absorption mechanism. However, since a significant portion of the hydrocarbons other than hydrogen are not passed through absorber 15, the amount of intercooling, and consequently the size of any intercoolers, is significantly reduced. In similar fashion, at a temperature of at least —90° F. for the absorber oil, fewer B.t.u.'s per hour of refrigeration are required on the demethanizer than would be conventionally required with hydrogen present. Complementing this advantage is the fact that the heat exchanger duties for the refrigeration are also at a higher level thereby effecting power savings. Still further, the scheme of the present invention has the advantage in that no additional compression is required to put the purified hydrogen and methane streams back to battery limit pressure for further use. Also, since the $C_3$ hydrocarbons originally present in the feed mixture are used as the absorber oil, the demethanizer acts as a desorption oil purifier. Therefore, the practice of this invention may be effected by conventional equipment by adding only a pre-separator and an absorber to the normal array of equipment in a gas separation plant.

As used herein, the term "$C_1$ hydrocarbon" comprises methane, "$C_2$ hydrocarbon(s)" comprise ethane, ethylene, or mixtures thereof; and "$C_3$ hydrocarbon(s)" comprise propane, propylene, or mixtures thereof.

Example

The following example is introduced for the purpose of further illustrating the novelty and utility of the present invention. The feed is a gaseous stream collected from a fluid catalytic cracking unit. The example proceeds in accordance with the flow scheme shown in the appended drawing. The following Table I represents the separation of the gaseous components in accordance with the present invention using typical processing conditions previously described hereinabove. However, the stream analysis data is presented in a manner which excludes the amount of absorber oil being circulated through the system (about 314 moles per hour).

It is to be noted from Table I that the hydrogen purity is in excess of 75% by volume and typically is in excess of 90% by volume. Ethylene is also recovered in a purity of 99.9% by volume, with an overall ethylene recovery of above 91% by volume.

TABLE I

[Temperature of separator 11=−70° F.]

| Line No. | 10 | 12 | 13 | 16 | 17 | 19 | 33 | 21 | 26 | 23 |
|---|---|---|---|---|---|---|---|---|---|---|
| Mol/Hour: | | | | | | | | | | |
| $H_2$ | 332 | 2 | 330 | 321 | 9 | 11 | 11 | | | |
| $CH_4$ | 317 | 157 | 160 | 32 | 128 | 285 | 285 | | | |
| $C_2H_4$ | 175 | 117 | 58 | 1 | 57 | 174 | 3 | 171 | 171 | |
| $C_2H_6$ | 242 | 242 | | | | 242 | | 242 | 242 | |
| $C_3H_6$ | 318 | 318 | | | | 318 | | 318 | 9 | 309 |
| $C_3H_8$ | 194 | 194 | | | | 194 | | 194 | 3 | 191 |
| $C_4+$ | 3 | 3 | | | | 3 | | 3 | | 3 |
| Total | 1,581 | 1,033 | 548 | 354 | 194 | 1,227 | 299 | 928 | 425 | 503 |

What is claimed is:

1. Process for separating the components of a gaseous feed mixture containing hydrogen and $C_1$ to $C_3$ hydrocarbons which comprises:
    (a) introducing a portion of said feed mixture comprising primarily hydrogen and methane into an absorption zone in contact with a lean absorption medium under conditions sufficient to absorb substantially all of said methane thereby producing a rich absorption medium such that the hydrogen off-gas from the absorption zone comprises at least 75% by volume hydrogen; and
    (b) admixing the rich absorption medium of step (a) and the whole remaining portion of said mixture and passing the admixture into a separation zone under conditions sufficient to produce therefrom a high purity methane product stream, a $C_2$ fraction comprising ethane and ethylene, and a $C_3$ fraction comprising propane and propylene.

2. Process according to claim 1 wherein said conditions of step (a) include a temperature of at least −90° F. and wherein said lean absorption medium comprises at least a portion of said $C_3$ fraction of step (b).

3. Process for purifying hydrogen from a principally gaseous feed mixture comprising hydrogen and $C_1$ to $C_3$ hydrocarbons which comprises the steps of
    (a) introducing said mixture into a separation zone in the substantial absence of any recycle stream under conditions including a pressure from 400 to 600 p.s.i.g., a temperature from −40° F. to −80° F. sufficient to separate said mixture into a vapor product comprising hydrogen and methane and a liquid product comprising hydrocarbons substantially free from hydrogen;
    (b) passing said vapor product into an absorber and contacting said vapor product therein with a hereinafter specified lean oil under conditions including a temperature of at least −90° F. sufficient to absorb methane while substantially rejecting hydrogen;
    (c) removing from the absorber a purified hydrogen stream comprising at least 75% by volume hydrogen;
    (d) withdrawing from the absorber a rich oil comprising said lean oil and absorbed hydrocarbons;
    (e) introducing said rich oil and said liquid product from step (a) into a demethanizing fractionating column under conditions sufficient to form an overhead product comprising methane and a bottoms stream comprising $C_2$ and $C_3$ hydrocarbons;
    (f) passing the bottoms stream of the demethanizer into a deethanizing zone wherein said bottoms stream is separated into a $C_2$ hydrocarbon fraction comprising ethane and ethylene and a $C_3$ hydrocarbon fraction comprising propane and propylene; and,
    (g) returning a portion of said $C_3$ fraction to the absorber as said lean oil specified.

4. Process according to claim 3 wherein said vapor product from step (a) is cooled to a temperature of from −90° F. to −100° F. by auto-refrigeration means prior to the absorbing step.

5. Process according to claim 4 wherein at least a portion of said overhead product from step (e) is heat exchanged with the returning lean oil prior to flow to the absorber thereby cooling said lean oil, and wherein hydrogen and methane are removed as separate substantially pure product streams.

6. Process acocrding to claim 3 wherein at least a portion of said overhead product from step (e) is heat exchanged with the returning lean oil prior to flow to the absorber thereby cooling said lean oil.

7. Process according to claim 6 wherein at least a portion of said rich oil from step (d) is heat exchanged with the lean oil returning to the absorber thereby cooling said lean oil.

References Cited

UNITED STATES PATENTS

| 2,451,136 | 10/1948 | Wenzke | 55—51 X |
| 2,719,816 | 10/1955 | Rich | 55—56 X |
| 2,813,920 | 11/1957 | Cobb | 260—683 |
| 3,197,970 | 8/1965 | Nelson et al. | 55—56 X |

REUBEN FRIEDMAN, *Primary Examiner.*

R. W. BURKS, *Assistant Examiner.*